United States Patent
Chun et al.

(10) Patent No.: US 7,236,775 B2
(45) Date of Patent: Jun. 26, 2007

(54) METHOD FOR TRANSMITTING DESTINATION INFORMATION IN MOBILE COMMUNICATION TERMINAL

(75) Inventors: Kyong-Joon Chun, Seoul (KR); Young-Khon Moon, Suwon-shi (KR); Jae-Eun Yi, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 272 days.

(21) Appl. No.: 10/370,980

(22) Filed: Feb. 20, 2003

(65) Prior Publication Data

US 2004/0203916 A1  Oct. 14, 2004

(30) Foreign Application Priority Data

Jul. 4, 2002  (KR)  ...... 10-2002-0038584

(51) Int. Cl.
*H04M 3/00* (2006.01)
(52) U.S. Cl. ........... 455/418; 455/414.1; 455/412.1; 379/216.1; 379/69
(58) Field of Classification Search ........ 455/564, 455/412.2, 412.1, 460, 550.1, 456.1, 457, 455/518, 520, 414.1, 418; 379/67.1, 68, 379/216.01, 69, 216.1; 709/246, 203
See application file for complete search history.

(56) References Cited

U.S. PATENT DOCUMENTS

| | | | | |
|---|---|---|---|---|
| 5,491,745 | A * | 2/1996 | Roeder | 379/355.09 |
| 5,901,365 | A * | 5/1999 | Yasuda et al. | 455/564 |
| 6,185,295 | B1 * | 2/2001 | Frederiksen et al. | 379/355.05 |
| 6,393,304 | B1 * | 5/2002 | Meche | 455/563 |
| 6,470,190 | B2 * | 10/2002 | Karhu | 455/550.1 |
| 6,535,749 | B1 * | 3/2003 | Iwata et al. | 455/556.2 |
| 6,879,824 | B1 * | 4/2005 | Otsubo et al. | 455/414.1 |
| 2001/0016500 | A1 * | 8/2001 | Son et al. | 455/456 |
| 2002/0022473 | A1 * | 2/2002 | Takagi et al. | 455/405 |
| 2002/0095517 | A1 * | 7/2002 | Sasaki et al. | 709/246 |
| 2002/0123368 | A1 * | 9/2002 | Yamadera et al. | 455/556 |
| 2002/0164999 | A1 * | 11/2002 | Johnson | 455/456 |
| 2002/0169891 | A1 * | 11/2002 | Sasaki et al. | 709/245 |
| 2003/0013484 | A1 * | 1/2003 | Nishimura et al. | 455/556 |
| 2004/0203610 | A1 * | 10/2004 | Deeds | 455/412.1 |

FOREIGN PATENT DOCUMENTS

| | | |
|---|---|---|
| CN | 1131364 | 9/1996 |
| CN | 1279760 | 1/2001 |
| CN | 1420043 | 5/2003 |

* cited by examiner

*Primary Examiner*—Danh Le
(74) *Attorney, Agent, or Firm*—The Farrell Law Firm

(57) ABSTRACT

A method for transmitting and for storing destination information in a mobile communication terminal is disclosed. The method for transmitting destination information includes determining whether a navigation mode is enabled and, if the navigation mode is enabled, determining whether a hot key is pressed for a predetermined time. If the hot key is pressed for the predetermined time, destination address information corresponding to the hot key is read, and transmitted to an information center over a wireless network. Therefore, since a phone book of the mobile communication terminal is interworked with destination address information for navigation, the present invention simplifies procedures needed to transmit the destination address information using the mobile communication terminal.

5 Claims, 6 Drawing Sheets

```
NAME :
RESIDENCE
PHONE NUMBER [    ]

ADDRESS :
MOBILE PHONE [   ]

OFFICE/SCHOOL [   ]

ADDRESS :
```

FIG.3A

```
NAME : GIL-DONG HONG
RESIDENCE
PHONE NUMBER [001]
031-111-2222
ADDRESS :
MOBILE PHONE [002]
016-000-3333
OFFICE/SCHOOL [003]
031-222-3333
ADDRESS :
```

FIG.3B

```
NAME : GIL-DONG HONG
RESIDENCE
PHONE NUMBER [001]
031-111-2222
ADDRESS : MANGPO-DONG,
PALDAL-GU, SUWON-CITY
MOBILE PHONE [002]
016-000-3333
OFFICE/SCHOOL [003]
031-222-3333
ADDRESS : MAETAN-DONG,
PALDAL-GU, SUWON-CITY
```

FIG.3C

METHOD FOR TRANSMITTING DESTINATION INFORMATION IN MOBILE COMMUNICATION TERMINAL

PRIORITY

This application claims priority to an application entitled "Method For Transmitting Destination Information in Mobile Communication Terminal", filed in the Korean Industrial Property Office on Jul. 4, 2002 and assigned Ser. No. 2002-38584, the contents of which are hereby incorporated by reference.

BACKGROUND OF THE INVENTION

1. Field of the Invention

The present invention relates to a navigation system, and more particularly to a method for transmitting destination information in a mobile communication terminal.

2. Description of the Related Art

Typically, a navigation system displays a current position of a moving object, calculated by information received from a GPS (Global Positioning System), on a map displayed on a display screen. The navigation system provides a driver with a variety of navigation information such as a proceeding direction of the moving object, a distance from a current position to the destination, a current speed of the moving object, a driving path preset by the driver, and an optimum path to the destination, etc. Such a navigation system (or GPS system) is mounted to a variety of moving objects such as a ship, an airplane, and an automobile, and is widely used for checking current position and current speed of the moving objects or determining moving path of them. In particular, the navigation system calculates the current position of the moving object by receiving radio signals indicating latitude, longitude, and altitude from a plurality of satellites involved in a GPS system, and then visually displays map information having the calculated current position for a driver, or audibly informs the driver of the map information.

In the meantime, to allow a user to receive navigation information (e.g., path guide information) from the conventional navigation system, the user gains access to the information center by selecting a navigation mode preset in a mobile communication terminal, and performs an additional process for acquiring his or her desired information. For example, to allow the user to receive guide information concerning an optimal traveling path to his or her desired destination, the user has to set the destination on a display screen of the mobile communication terminal when the mobile communication terminal is switched to a navigation mode. In conclusion, in order to allow the user to receive his or her desired navigation service, the typical navigation system requires the user to perform complicated processes, for example, the user sets the mobile communication terminal to a navigation mode, selects a desired service in the navigation mode, and manually inputs his or her desired information, if necessary.

SUMMARY OF THE INVENTION

Therefore, the present invention has been made in view of the above problems, and it is an object of the present invention to provide a method for simplifying a process for handling a mobile communication terminal when a user transmits destination address information.

In accordance with the present invention, the above and other objects can be accomplished by the provision of a method for transmitting destination information in a mobile communication terminal having a memory storing destination address information, comprising the steps of a) determining whether a navigation mode is enabled or not; b) if the navigation mode is enabled, determining whether a hot key is pressed for a predetermined time; and c) if the hot key is pressed for the predetermined time, reading destination address information corresponding to the hot key, and transmitting the destination address information to an information center over a wireless network.

BRIEF DESCRIPTION OF THE DRAWINGS

The above and other objects, features and other advantages of the present invention will be more clearly understood from the following detailed description taken in conjunction with the accompanying drawings, in which:

FIG. 3A is a view illustrating a display provided to allow a mobile communication terminal to make a phone book in accordance with a preferred embodiment of the present invention;

FIG. 3B is a view illustrating a display provided to allow a mobile communication terminal to add destination address information to prior phone book information in accordance with a preferred embodiment of the present invention;

FIG. 3C is a view illustrating a phone book having the destination address information added by a mobile communication terminal in accordance with a preferred embodiment of the present invention;

DETAILED DESCRIPTION OF THE PREFERRED EMBODIMENTS

Figure 1:
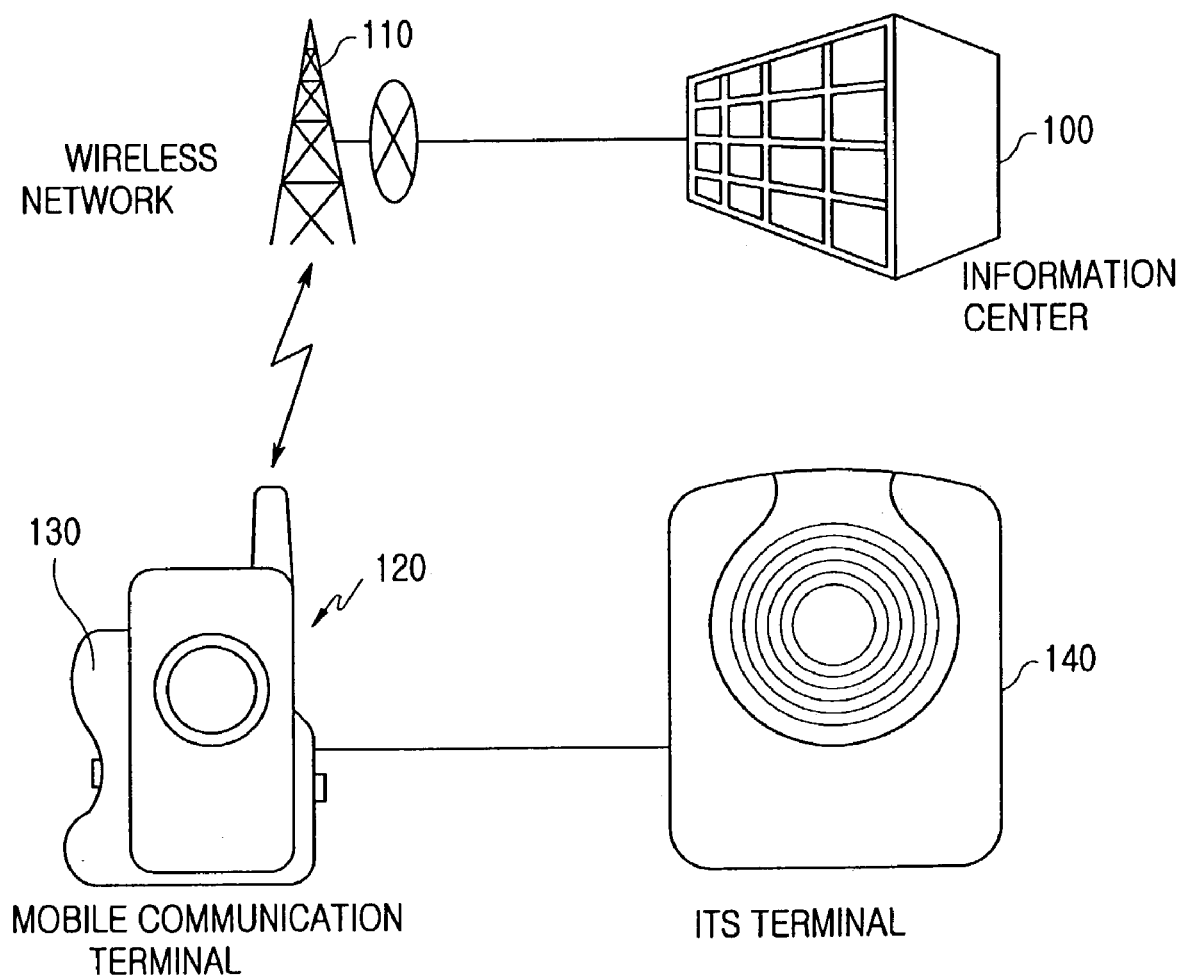
FIG. 1 is a view illustrating a navigation system using a mobile communication terminal in accordance with the present invention.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

FIG. 1 is a view illustrating a navigation system using a mobile communication terminal in accordance with the present invention. This navigation system provides a user with a navigation function via a mobile communication terminal.

Referring to FIG. 1, a navigation system comprises an information center 100, a mobile communication terminal 120, a wireless network 110, and an ITS (Intelligent Transportation Systems) terminal 140. If a user pushes a hot key of the mobile communication terminal 120, then the user easily receives a navigation service without performing a cumbersome manipulation while driving. The hot key, for example, may include a number key in a navigation mode. The information center 100 provides navigation information having path guide information. Besides the path guide information, the navigation information includes a variety of information such as peripheral building information, traffic information, living information, bookmark information, and other auxiliary information, etc. The mobile communication terminal 120 has a navigation mode, receives the navigation information by accessing the information center 100 in the navigation mode, and then visually or audibly guides the user to the received navigation information. Particularly, according to the present invention, in the case where the user pushes a number key in the navigation mode, the mobile communication terminal 120 transmits destination address information corresponding to the number key to the information center 100 over a wireless network 110. The mobile communication terminal 120 is detachably connected to a cradle 130 mounted on an automobile. That is, the cradle 130 is mounted to the automobile to enable the mobile communication terminal 120 to be detachably attached thereto, and is electrically connected to the mobile communication terminal 120. Also, the cradle 130 is electrically connected to the ITS terminal 140. A representative example of the mobile communication terminal 120 is a cellular phone or a mobile phone, but the mobile communication terminal 120 may include a PDA (Personal Digital Assistant), or a handheld-PC, etc. The wireless network 110 is provided for a radio connection between the information center 100 and the mobile communication terminal 120. The ITS terminal 140 may further include a memory for storing bookmark information and navigation target information.

Figure 2:
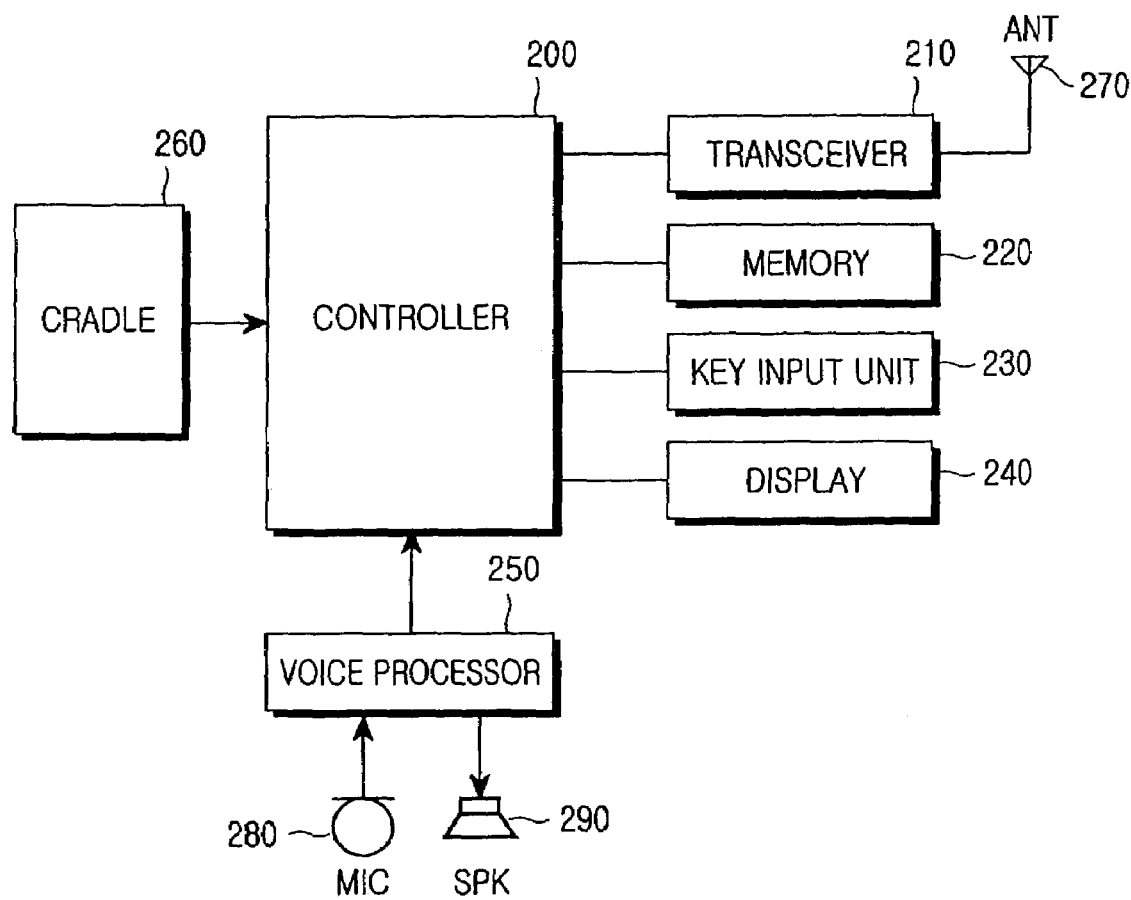
FIG. 2 is a view illustrating a block diagram of a mobile communication terminal in accordance with the present invention.

FIG. 2 is a view illustrating a block diagram of a mobile communication terminal in accordance with the present invention.

Referring to FIG. 2, a mobile communication terminal 120 comprises an antenna (ANT), a controller 200, a transceiver 210, a memory 220, a key input unit 230, a display 240, a voice processor 250, a microphone (MIC), and a speaker (SPK). The antenna (ANT) transmits transmission signals received from the transceiver 210 to an information center 100 over a wireless network 110, and receives output signals of the information center 100 over the wireless network 110. The controller 200 controls an overall operation of a mobile communication terminal 120. Particularly, according to the present invention, in the case where there is a number key input signal for a predetermined time in a navigation mode, the controller 200 retrieves destination address information corresponding to the number key from a phone book over the wireless network 110, and transmits it to the information center 100.

The transceiver 210 outputs signals to the information center 100, and receives signals from the information center 100 via the antenna (ANT). The memory 220 stores a navigation program for performing various operations of the present invention and data processed by the navigation program. Particularly, the memory 220 stores a phone book additionally having destination address information. The phone book is shown in FIGS. 3A to 3C. The memory 220 includes a storage area for storing a plurality of destination address fields input by a user. The destination address fields are shown in the following Table 1.

TABLE 1

| Number Key | Memory Address | Destination Address |
|---|---|---|
| 0 | 000 | Hyehwa-dong Seoul National University Hospital |
| 1 | 001 | Mangpo-dong Paldal-gu Suwon-city |
| 3 | 003 | Maetan-dong Paldal-gu Suwon-city |
| . | . | . |
| . | . | . |
| . | . | . |

With reference to Table 1, if the number key '0' is pressed by a user for a predetermined time in the navigation mode, then the controller 200 searches a memory address '000' corresponding to the number key '0', and transmits destination address information corresponding to "Hyehwa-dong Seoul National University Hospital" contained in the memory address '000' to the information center 100 over the wireless network 110. If the number key "1" is pressed by the user for a predetermined time in the navigation mode, then the controller 200 searches a memory address '001' corresponding to the number key '1', and transmits destination address information corresponding to "Mangpo-dong Paldal-gu Suwon-city" contained in the memory address "001" to the information center 100 over the wireless network 110. If the number key "3" is pressed by the user for a predetermined time in the navigation mode, then the controller 200 searches a memory address '003' corresponding to the number key '3', and transmits destination address information corresponding to "Maetan-dong Paldal-gu Suwon-city" contained in the memory address "003" to the information center 100 over the wireless network 110.

The key input unit 230 provides an interface between the mobile communication terminal 120 and a user. By the key input unit 230, the user sets a navigation mode, and inputs a variety of navigation information accompanied by a navigation service. The display 240 displays navigation information or the required operation contents on a screen of the mobile communication terminal 120. For example, the information such as phone book shown in FIGS. 3A–3C may be displayed on the display 240.

The voice processor 250 processes voice signals received via the microphone (MIC), and processes voice signals to be output to the speaker (SPK). The microphone (MIC) receives voice signals produced from the user, converts the received voice signals into electric signals, and then outputs them. The speaker (SPK) converts electric signals to be output to the user into voice signals.

FIGS. 3A to 3C are views illustrating a phone book having destination address information in a mobile communication terminal in accordance with a preferred embodiment of the present invention.

FIG. 3A is a view illustrating a display provided to allow a mobile communication terminal to make a phone book in accordance with a preferred embodiment of the present invention.

FIG. 3B is a view illustrating a display provided to allow a mobile communication terminal to add destination address information to a prior phone book in accordance with a preferred embodiment of the present invention.

FIG. 3C is a view illustrating a phone book having the destination address information added by a mobile communication terminal in accordance with a preferred embodiment of the present invention.

The destination address information is managed in a manner different from a field indicating an address stored in a typical phone book. The address field of the typical phone book includes an arrangement of characters used for indicating an address, but the destination address information for indicating a destination is defined as a specific format for indicating specific information such as the destination. When the mobile communication terminal is registered or accessed to a server providing the destination information, the mobile communication terminal cooperates with the server in such a way that it receives the destination information provided from the server.

Figure 4:
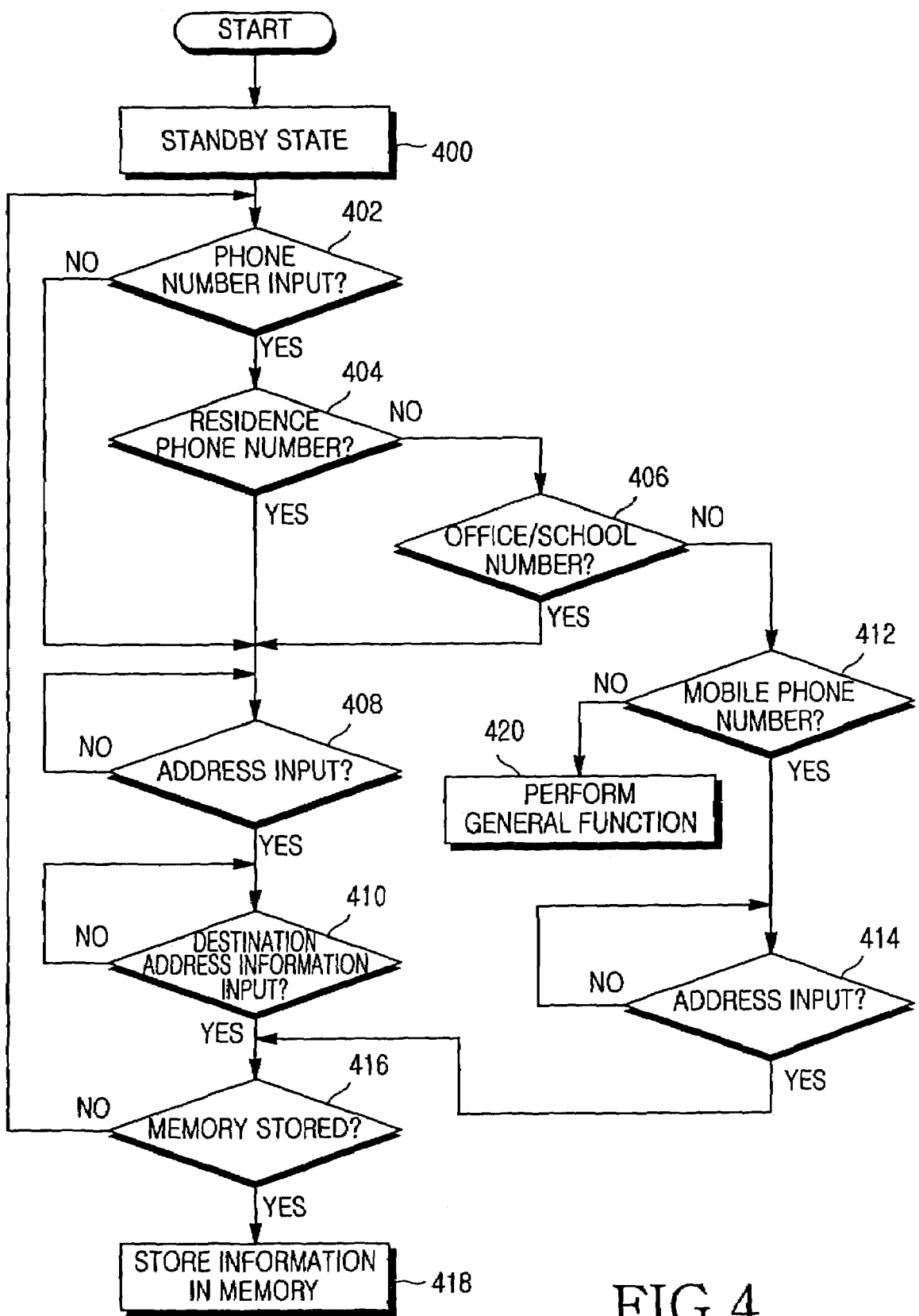
FIG. 4 is a flow chart illustrating a procedure for storing destination address information in a phone book of a mobile communication terminal in accordance with a preferred embodiment of the present invention.

FIG. 4 is a flow chart illustrating a procedure for storing destination address information in a phone book of a mobile communication terminal in accordance with a preferred embodiment of the present invention.

Referring to FIG. 4, a controller 200 commands a display 240 to display a phone book, and is in a standby state at step 400. The controller 200 determines at step 402 whether there is a phone number input signal. If there is a phone number input signal at step 402, then the controller 200 goes to step 404. If there is no phone number input signal at step 402, then the controller 200 goes to step 408.

The controller 200 determines at step 404 whether the phone number input signal is a residence phone number. If the phone number input signal is a residence phone number at step 404, then the controller 200 goes to step 408. If the phone number input signal is not a residence phone number at step 404, then the controller 200 goes to step 406.

The controller 200 determines at step 408 whether there is an address input signal corresponding to the residence phone number. If the address input signal corresponding to the residence phone number is detected at step 408, then the controller 200 goes to step 410. If there is no address input signal corresponding to the residence phone number at step 408, then the controller 200 repeatedly performs the step 408. The controller 200 determines at step 410 whether there is a destination address information input signal. If the destination address information input signal is detected at step 410, then the controller 200 goes to step 416. If there is no destination address information input signal at step 410, then the controller 200 repeatedly performs the step 410.

For example, the destination address information may be manually input by a user, may be selected in the form of categories received from the information center, and may be stored by bookmark information or a recent navigation target connected to the phone book.

Herein, even when the user manually inputs destination information in the phone book, the controller 200 converts the user-input destination information into other data available in the information center and stores the converted destination information in the phone book, instead of directly storing the user-input destination information in the phone book. Therefore, the address information contained in the phone book may be the user-input data, may be the data received from the information center, or may be determined by a bookmark function or a recent navigation target. Herein, those data corresponding to the address information are represented by a general address representation method and data address representation method.

The controller 200 determines at step 416 whether there is a signal for commanding the memory 220 to store the phone book. If a signal for commanding the memory 220 to store the phone book is detected at step 416, then the controller 220 goes to step 418 to store the phone book in the memory 220. But, if a signal for commanding the memory 220 to store the phone book is not detected at step 416, then the controller 220 returns to step 402.

In the meantime, the controller 200 determines at step 406 whether there is an office/school number input signal. If an office/school number input signal is detected at step 406, then the controller 200 goes to step 408. If there is no office/school number input signal at step 406, then the controller 200 goes to step 412 to determine whether the input signal corresponds to a mobile phone number input signal.

If the input signal corresponds to the mobile phone number input signal at step 412, then the controller 200 goes to step 414. If the input signal is not the mobile phone number input signal at step 412, then the controller 200 goes to step 420 to perform a general function as described below. The controller 200 determines at step 414 whether there is an address input signal concerning the mobile phone number. If the address input signal concerning the mobile phone number is detected at step 414, then the controller 200 goes to step 416. If there is no address input signal concerning the mobile phone number at step 414, then the controller 200 repeatedly performs step 414.

FIG. 4 is a flow chart illustrating a procedure for storing destination address information at a phone book of a mobile communication terminal in the standby state. In accordance with a preferred embodiment of the present invention, the destination information may be manually input by a user in a phone book input mode, may be selected in a form of categories provided from an information center and may be stored by bookmark information or a recent navigation target connected to the phone book.

For example, a procedure for inputting a destination address in a phone book input mode is as follows.

The phone input book mode is a mode that corresponds to the prior mode for storing a telephone number in a phone book and, in this invention, to a mode for storing a telephone number or destination address in a phone book. For instance, if the phone book input mode is selected via a menu, the mobile communication terminal provides the user with an interface for registering a destination address in a phone book such as in the format depicted in FIG. 3A. The user inputs a destination address via the provided interface and designates the address. The controller 200 of the mobile communication terminal displays the selected address and a destination address which is input and checks whether the key input signal for storing them in a memory 220 is received. If a key input signal is detected for storing in a memory, the phone book to which the destination address is added is stored in a memory 220. FIG. 3C is a view of the screen showing completion of storing of the destination address in the phone book.

When storing the destination address in the phone book, the memory address in which a destination address is to be registered is preferably automatically determined as the smallest number from among the destination addresses that has not yet been registered as the default, or alternatively is determined according to a user's selection among the addresses which have not yet been registered.

Figure 5:
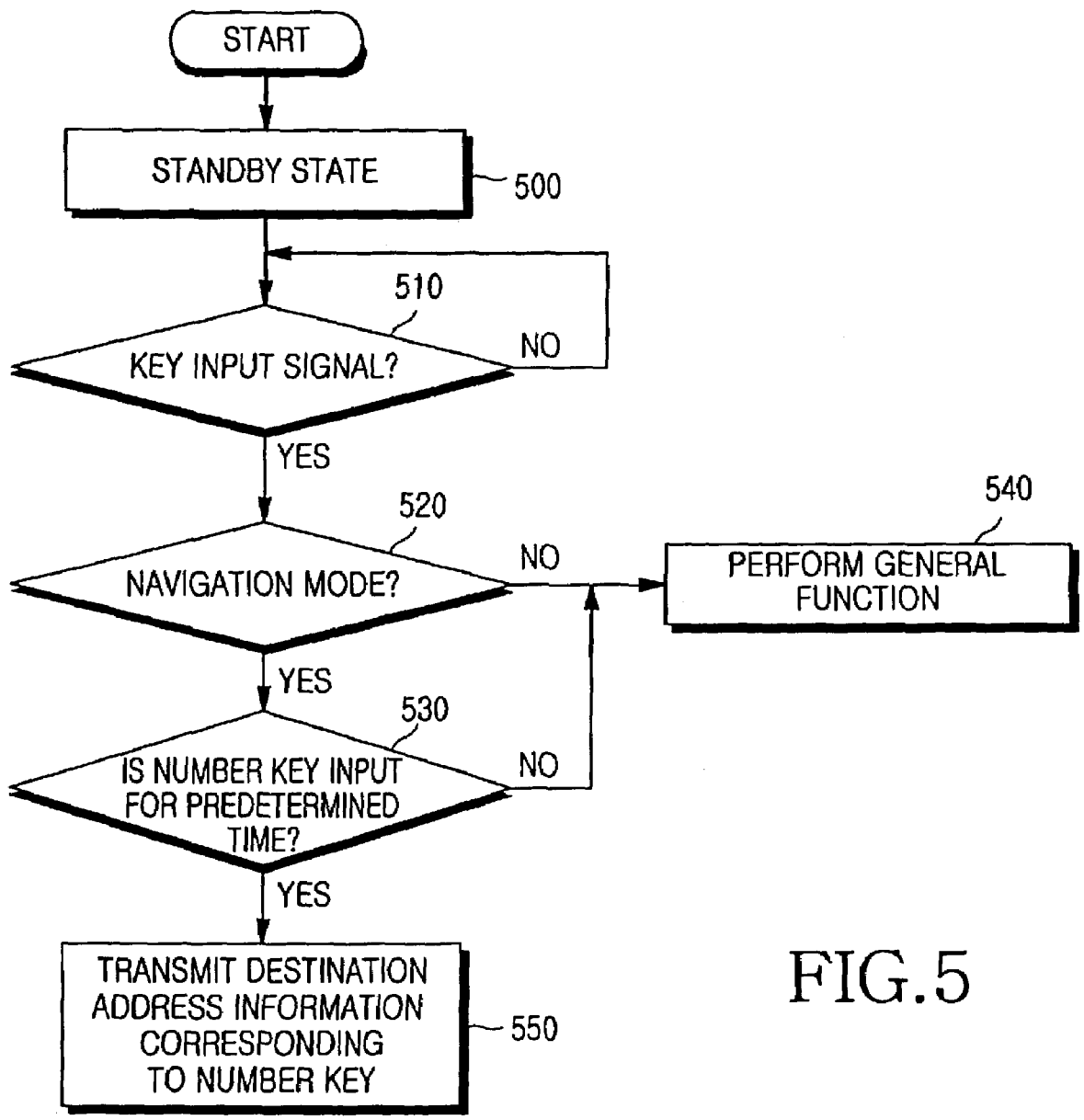
FIG. 5 is a flow chart illustrating a procedure for enabling a mobile communication terminal to transmit destination information in accordance with a preferred embodiment of the present invention.

FIG. 5 is a flow chart illustrating a procedure for enabling a mobile communication terminal to transmit destination information in accordance with a preferred embodiment of the present invention.

Referring to FIG. 5, the controller 200 is in a standby state at step 500. The standby state in one aspect, includes a predetermined state wherein the mobile communication terminal 120 is mounted to a cradle 130 and the cradle 130 is connected to an ITS terminal 140. The controller 200 determines at step 510 whether there is a key input signal.

If a key input signal is detected at step 510, then the controller 200 goes to step 520. If no key input signal is detected at step 510, then the controller 200 repeatedly performs the step 510.

The controller 200 determines at step 520 whether the key input signal is a navigation mode selection signal. If the key input signal is a navigation mode selection signal at step 520, then the controller goes to step 530. If the key input signal is not a navigation mode selection signal at step 520, then the controller goes to step 540 to perform a general function.

The controller 200 determines at step 530 whether there is a number key input signal for a predetermined time. If a number key input signal is detected for a predetermined time at step 530, the controller 200 goes to step 550. If there is no number key input signal for a predetermined time at step 530, the controller 200 goes to step 540. For example, the predetermined time is set to between one and two seconds. At step 550, the controller 200 retrieves destination address information corresponding to a number key from the memory 220, and then transmits the destination address information.

As apparent from the above description, since a phone book of a mobile communication terminal is interworked with destination address information for navigation, the present invention simplifies procedures needed to transmit the destination address information using the mobile communication terminal.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for transmitting destination information in a mobile communication terminal having a memory storing destination address information, comprising the steps of:

determining whether a navigation service mode is enabled;

if the navigation service mode is enabled, determining whether a hot key is pressed for a predetermined time; and if the hot key is pressed for the predetermined time, reading pre-stored destination location information corresponding to the hot key, and transmitting the pre-stored destination location information to an information center over a wireless network, the pre-stored destination location information including location information.

2. A method for storing destination location information in a mobile communication terminal having a memory storing a phone book, comprising the steps of:

receiving a destination location information by a user;

assigning an arbitrary entry in said phone book to which the destination location information has not yet been registered by the user, the arbitrary entry including a phone number and corresponding destination location information including a physical address;

registering said input destination location information in said assigned entry; and transmitting pre-sorted destination location information to an information center if a hot key corresponding to a predetermined entry is pressed when a navigation service mode is enabled.

3. The method as set forth in claim 2, further comprising the step of:

selecting the destination location information in a form of categories provided from the information center, and storing a categorized destination location information in the memory.

4. The method as set forth in claim 2, further comprising the step of:

storing the destination location information by employing bookmark information previously stored in an ITS (Intelligent Transportation System) terminal.

5. The method as set forth in claim 2, further comprising the step of:

storing the destination location information by employing recent navigation target information previously stored in an ITS (Intelligent Transportation System) terminal.

* * * * *